United States Patent [19]

Brouttelande

[11] Patent Number: 5,379,331
[45] Date of Patent: Jan. 3, 1995

[54] TRANSVERSE HOLDING DEVICE FOR A STEAM GENERATOR OF A PRESSURIZED WATER NUCLEAR REACTOR, AND FOR ITS ADJUSTMENT

[75] Inventor: Serge Brouttelande, Ermont, France

[73] Assignee: Framatome, Courbevoie, France

[21] Appl. No.: 36,245

[22] Filed: Mar. 24, 1993

[30] Foreign Application Priority Data

Mar. 31, 1992 [FR] France ............... 92 03897

[51] Int. Cl.[5] .......................................... G21C 13/024
[52] U.S. Cl. ..................................... 376/285; 376/461
[58] Field of Search ............... 376/285, 461, 302, 303, 376/304; 122/510; 248/146, 154

[56] References Cited

U.S. PATENT DOCUMENTS

| | | | |
|---|---|---|---|
| 3,795,139 | 3/1974 | Peck | 376/250 |
| 3,850,795 | 11/1974 | Thome | 376/302 |
| 4,581,199 | 4/1986 | Bioret et al. | 376/461 |
| 4,940,025 | 7/1990 | Ott et al. | 376/285 |
| 5,152,253 | 10/1992 | Jenko et al. | 376/285 |
| 5,278,880 | 1/1994 | Baker et al. | 376/285 |

FOREIGN PATENT DOCUMENTS 2424518 5/1975 Austria .
0079048 5/1983 European Pat. Off. .
0391060 10/1990 European Pat. Off. .

*Primary Examiner*—Daniel D. Wasil
*Attorney, Agent, or Firm*—Pollock, Vande Sande & Priddy

[57] ABSTRACT

An adjusting and positioning assembly for a bearing element (55), constituted by a nut (52) carried by a base plate, (40) fixed on a wall of a concrete structure in which the component is arranged, and a screw-jack (54) engaged with and blockable with respect to the nut (52). The transverse holding of the lower part of a steam generator pressurized-water nuclear reactor is provided by an assembly of supports each constituted by an adjustable transverse holding device (24) according to the invention. The position of the bearing element is adjusted in such a manner as to maintain play allowing movement of the steam generator as a result of thermal effects or in the event of an earthquake.

9 Claims, 4 Drawing Sheets

TRANSVERSE HOLDING DEVICE FOR A STEAM GENERATOR OF A PRESSURIZED WATER NUCLEAR REACTOR, AND FOR ITS ADJUSTMENT

FIELD OF THE INVENTION

The invention relates to a transverse holding device for a component of large dimensions of a nuclear reactor, such as a steam generator, and to a method for adjusting a holding assembly of the component.

BACKGROUND OF THE INVENTION

Steam generators of nuclear reactors cooled by pressurized water are components of large dimensions comprising an enclosure of general cylindrical shape, placed with its axis vertical, in a lateral arrangement with respect to the vessel of the nuclear reactor enclosing the core, within a stationary concrete structure comprising vertical walls, called a bunker.

Each of the steam generators is placed on a loop of the primary circuit of the nuclear reactor constituted by pipelines of large diameter connecting the vessel to the primary part of the steam generator. One of these pipelines, called hot leg, ensures a direct connection between the vessel and the inlet part to the water box of the steam generator ensuring the distribution of pressurized water for cooling the reactor in the tubes of the bundle of the steam generator, which tubes are contained within the enclosure.

A second pipeline or intermediate leg connects the outlet part of the water box of the steam generator to a primary pump ensuring the circulation of the cooling water in the loop of the primary circuit.

The primary pump is connected to the vessel of the steam generator, in such a manner as to return the cooled cooling water into the steam generator within the vessel, via a third pipeline, called a cold leg.

The steam generator rests, within the concrete bunker, on vertically articulated support columns connected at their lower part to support plates embedded in a concrete slab constituting the bottom of the bunker.

Moreover, the steam generator is held within the bunker by an assembly of tie rods and dampers interposed between the vertical walls of the bunker and a ring for holding the wrapper of the steam generator situated in the vicinity of the middle part of the steam generator, between its lower end constituting the wall of the water box and its upper end from where the steam produced within the generator exits.

The steam generator also comprises transverse holding devices or supports ensuring the guiding of the steam generator and holding it in the event of an accident. These devices or supports are arranged in the vicinity of the primary bottom of the steam generator constituting the wall of the water box.

The transverse holding assembly of the steam generator generally comprises two lateral supports placed in symmetric positions with respect to the vertical plane containing the axis of the hot leg and a front support of which the contact zone with the steam generator is situated in the vicinity of the vertical plane containing the axis of the hot leg and in an opposite position with respect to the hot leg connected to the water box.

Holding supports for the Steam generator comprise a bearing element intended to come into contact with or into the vicinity of a bearing surface of the steam generator which can be constituted either by the primary bottom of the generator, i.e. the external surface of the water box, or by the outer lateral surface of the tube plate upon which the bundle of tubes for the steam generator is fixed and which provides the junction between the water box and the wrapper of the steam generator, or alternatively by a welded ring surrounding the lower part of the steam generator.

The holding devices each comprise a base plate anchored in the concrete of one of the walls of the bunker to which the bearing element of the support is connected, which can be constituted by a second base plate fixed on the first in a parallel arrangement with a certain spacing.

Generally, an energy absorbing system is interposed between the two base plates, in such a manner as to damp out impacts or energy connected with movement of the steam generator in the event of an accident.

These energy absorbers can be constituted by "cushions" made of stainless steel wires.

In the case of the front support, the energy absorption system is generally constituted by several rows of steel bars arranged parallel to each other in each of the rows and in arrangements perpendicular from one row to the next and staggered, in such a manner as to absorb the energy by deformation or bending, in the event of an accidental movement of the steam generator in the direction of the corresponding wall of the bunker.

When the steam generator is installed in the bunker, the supports which ensure transverse holding of its lower part must be adjusted, in such a manner that a perfectly defined play remains between the bearing element of each of the supports and the corresponding bearing surface of the steam generator.

The play is defined as a function of the foreseeable movements of the steam generator, in normal operation and during an accident due to a cause internal to the nuclear reactor, for example due to rupture of a primary pipe or to steam or due to a cause which is totally external to the nuclear reactor, such as an earthquake.

The play can be variable as a function of the supports, in that the movements of the steam generator are not identical in all directions.

The bearing element of the front support is thus generally arranged at a significant distance, of the order of 50 mm from the surface of the steam generator, the movements of the steam generator in the axis of the hot leg having a relatively significant amplitude. Due to this significant play, the front supports do not come into contact with the steam generator and do not participate in holding the steam generator in the event of an earthquake.

The lateral supports arranged on the side of the plane of symmetry of the hot leg on which are situated the intermediate leg and the primary motor-driven pump group must be arranged with zero play with respect to the bearing surface of the steam generator. Thus, the guiding of the steam generator with respect to this reference is assured, both during normal operation of the steam generator and in the event of an accident.

The other lateral supports situated in a symmetric position with respect to an axial plane of the hot leg comprise bearing elements arranged with a certain play with respect to the surface of the steam generator.

The adjustment of the supports constituting the shimming operation of the steam generator must be carried out during the mounting of any new generator in a nuclear power station, whether it concerns a generator intended for a new power station before it is put into service or a replacement steam generator intended for a nuclear reactor which has operated for a longer or shorter period of time.

The adjustment of the play of the various supports is carried out by fixing shims of appropriate thickness on an external base plate of the support directed towards the steam generator and connected to the fixed base plate anchored in the concrete of the wall of the bunker. The external base plate and the shims in this case constitute the bearing element of the support intended to come into contact with the bearing surface of the steam generator.

The shimming of the steam generator is carried out in several phases.

During hot testing of the nuclear reactor, the primary fluid being at 155 bar and 286° C. during these tests, which corresponds to the nominal operational conditions of the reactor, the lower lateral and front supports of the steam generator are installed and preadjusted, and the play between the steam generator and the external base plates of the supports which do not comprise any shims in this phase is measured.

The measured values of the play during the hot testing of the steam generator are communicated to the research department of the constructor of the nuclear reactor.

The necessary shim thicknesses are calculated as a function of the play measured and the movements of thermal origin of the steam generator which are calculated.

Prefabricated shims are labelled as a function of their destination and equipped with lifting means to enable them to be handled.

The shims are then pierced, machined to their final dimensions, checked and delivered to the site of the nuclear reactor. The shims which are identified on site are installed and fixed either by screws, or by welding, in the bunker of the steam generator, the primary circuit being at a low temperature.

It is necessary to carry out the operations described above on an assembly of about thirty shims, in order to provide the shimming of a steam generator, each of the lateral supports and the front support requiring the presence of ten shims to ensure its adjustment.

These operations are thus long and complex, which has drawbacks, especially in replacing a worn steam generator. In fact, in this case, it is necessary to reduce to a minimum the amount of time needed to replace the steam generator and the total shut-down time of the nuclear reactor.

SUMMARY OF THE INVENTION

An object of the invention is thus to propose a transverse holding device for a component of large dimensions of a nuclear reactor, such as a steam generator of a pressurized-water nuclear reactor, arranged in a stationary concrete structure having vertical walls surrounding the component, comprising at least one base plate fixed on one wall of the concrete structure and a bearing element carried by the base plate and arranged in contact with or in the vicinity of a bearing surface of the component, this device allowing the adjustment of the bearing element without using shims of adjusted dimensions.

To this end, the device comprises an assembly for adjusting and positioning the bearing element constituted by:

a nut carried by the stationary base plate passed through along its axis by a tapped orifice, a screw-jack engaged with the nut and arranged in the axial direction, and a means for blocking the screw with respect to the nut, in a specified position of the screw in the axial direction, the bearing element being constituted by a pad carried by one end of the screw directed towards the bearing surface of the component.

The invention also relates to a transverse holding assembly for a component of large dimensions of a nuclear reactor and to its method of adjustment.

BRIEF DESCRIPTION OF THE DRAWINGS

In order to make the invention easier to understand, an embodiment will now be described, by way of example and with reference to the appended drawings, of a transverse holding assembly and device according to the invention of a steam generator of a pressurized-water nuclear reactor.

DESCRIPTION OF THE PREFERRED EMBODIMENT

Figure 1:
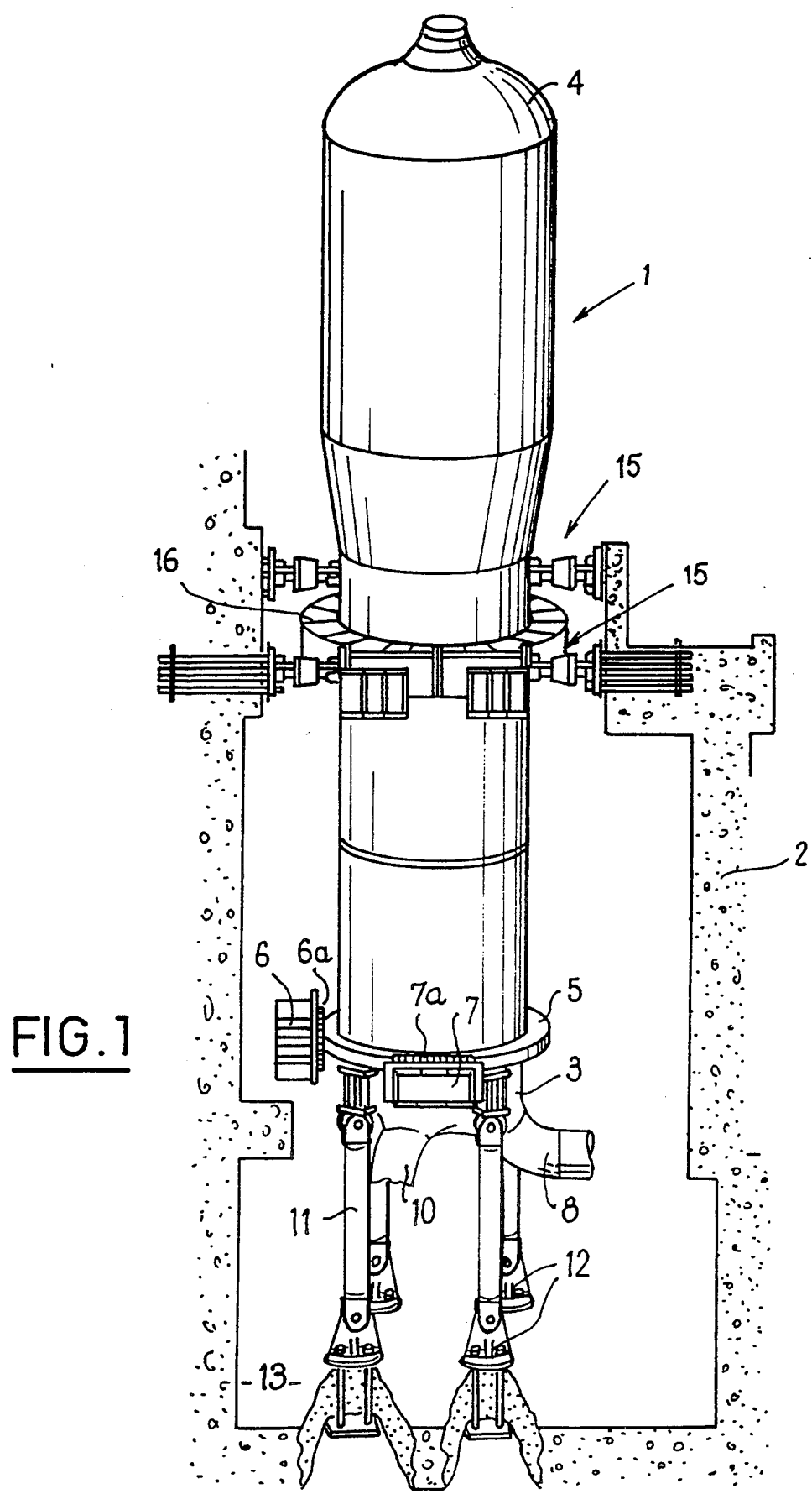
FIG. 1 is a view in elevation and in partial section of a steam generator comprising supporting and holding means according to the prior art.

FIG. 1 shows a steam generator of a pressurized-water nuclear reactor 1, of generally cylindrical form and arranged within a bunker 2 comprising lateral walls and constituting a part of the building of the nuclear reactor, which part is placed laterally with respect to the vessel well of the reactor in which the vessel enclosing the core constituted by fuel assemblies is arranged.

The steam generator 1 comprises an enclosure constituted by an assembly of cylindrical shells and of a frustoconical shell which are butt welded, the enclosure being closed at its ends by two domed bottoms 3 and 4 of substantially hemispherical shape.

The lower domed bottom 3 constitutes the water box of the steam generator, through the intermediary of which the pressurized cooling water of the nuclear reactor is distributed and caused to circulate within the tubes of the bundle arranged within the cylindrical enclosure; this water is then recovered after having circulated in the tubes of the bundle.

The water box 3 is connected to the cylindrical wrapper of the steam generator, through the intermediary of a tube plate of great thickness in which the tubes of the bundle are fixed by their ends.

In the region of the tube plate, a welded ring 5 is fixed in a coaxial arrangement around the outer surface of the steam generator 1. The outer peripheral surface of the welded ring 5 constitutes the bearing surface of the transverse holding devices such as 6 and 7 of the lower part of the steam generator.

The water box 3 of the steam generator is directly connected to the vessel of the reactor, by a pipeline 8 constituting the hot leg of the loop of the primary circuit on which the steam generator 1 is arranged. The pressurized water for cooling the reactor penetrates into the water box 3 via the hot leg 8, after having been heated in contact with the core assemblies, within the vessel.

The water box 3 is also connected to a pipeline 10 constituting the intermediary branch of the loop of the primary circuit on which is placed the primary pump (not shown) for circulating the cooling fluid.

The steam generator 1 rests on articulated support columns 11, through intermediary of supporting clevises bolted on a ring 5 securely attached to the tube plate.

The articulated support columns 11 arranged vertically are each connected at their lower part to a bearing plate 12 embedded into a slab 13 constituting the bottom of the bunker 2 resting on the base slab of the nuclear reactor.

The steam generator 1 is held transversely, i.e., in horizontal directions, by holding assemblies 15 comprising tie rods and dampers connected to a welded ring 16 fixed around the enclosure of the steam generator.

The transverse holding of the steam generator is provided at its lower part, by transverse holding devices or supports 6 and 7 which are fixed on the vertical walls of the bunker 2, in the region of the ring 5.

The support 6 or front support comprises a bearing part 6a placed opposite a zone of the bearing surface of the ring 5 arranged in the vicinity of a vertical plane containing the axis of the hot leg 8 and in a location situated opposite the hot leg 8, with respect to the axis of the steam generator.

Lateral supports such as the support 7 are arranged on either side of the vertical plane containing the axis of the hot leg 8, substantially symmetrically with respect to this plane.

In the case of a lower transverse holding device of the steam generator according to the prior art, such as that shown in FIG. 1, a significant play is left, on adjusting the holding assembly during the mounting of the steam generator, between the bearing part 6a of the front support 6 and the bearing surface of the ring 5.

The bearing part 7a of the lateral support 7 arranged on the side of the intermediary leg 10 and of the primary motor-driven pump group, with respect to the plane containing the axis of the hot leg, is arranged, during adjustment, in contact with the bearing surface of the ring 5, in such a manner as to provide the guiding of the steam generator 1, during movements thereof under the effect of expansions.

The second lateral support (not visible in FIG. 1) is placed with a certain play with respect to the bearing surface of the ring 5.

The adjustment of the play of the lateral and front supports is carried out, as indicated previously, during hot testing of the nuclear reactor, by machining an assembly of shims whose dimensions are defined by measurements of the residual play made when the steam generator is at its service temperature.

Such a method for adjusting the transverse holding devices according to the prior art requires numerous successive operations in order to manufacture and install the shims; this increases the time needed for mounting a steam generator in the containment of the reactor. This time is particularly critical when mounting a replacement steam generator.

Figure 2:
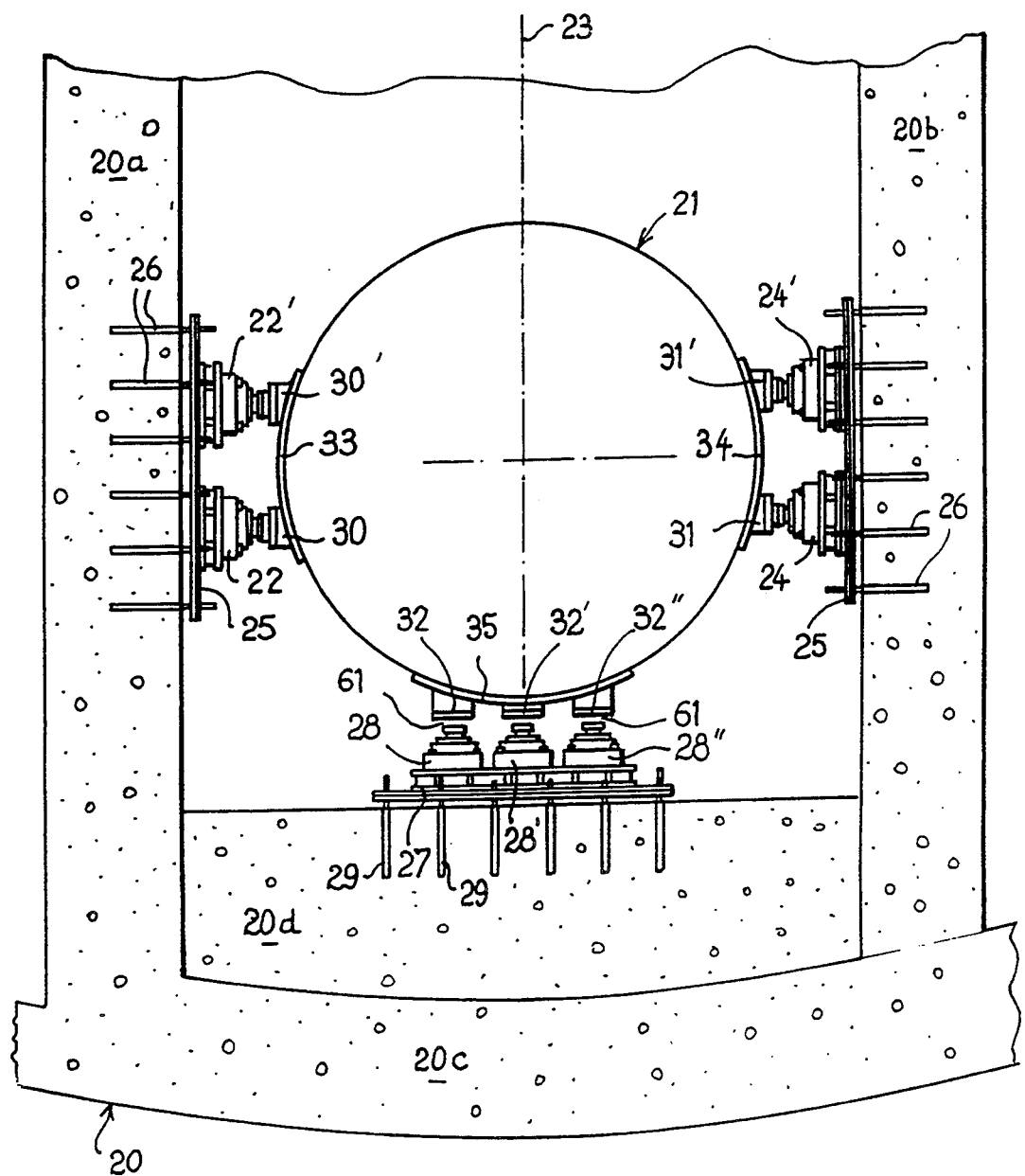
FIG. 2 is a view in transverse section of the lower part of a steam generator showing a transverse holding assembly of the generator, according to the invention.

FIG. 2 illustrates a transverse holding assembly for the lower part of a steam generator comprising adjustable holding devices according to the invention.

In FIG. 2 can be seen the lower part of the steam generator 21 within the bunker 20 which comprises the lateral vertical walls 20a and 20b and a front wall 20c in the shape of a portion of a cylinder.

The transverse holding assembly for the lower part of the steam generator 1 comprises two lateral supports 22 and 22' situated on a first side of the vertical plane of symmetry 23 containing the axis of the hot leg of the steam generator 21 and two lateral supports 24 and 24' situated in a position which is substantially symmetrical with the supports 22 and 22' with respect to the plane 23.

The pairs of supports 22, 22' and 24, 24' are fixed by the intermediary of a support plate 25 and embedding elements 26, onto the internal surface of the wall 20a of the bunker 20.

The transverse holding assembly for the lower part of the steam generator 21 also comprises three front supports 28, 28' and 28" fixed through the intermediary of a support plate 27 and embedding tie rods 29, onto a bearing block 20d attached against the wall 20c of the bunker 20.

The supports 22, 22', 24, 24', 28, 28' and 28" are all identical and constituted by adjustable holding devices according to the invention, to be described below.

The lateral and front supports 22, 22', 24, 24', 28, 28', 28" are arranged in the proximity of or in contact with bearing blocks, respectively 30, 30', 31, 31', 32, 32', 32" fixed against the external surface of the wrapper of the steam generator 21.

The bearing blocks 30 and 30' are fixed on the enclosure of the steam generator through the intermediary of a base plate in the shape of a portion of a cylinder 33. In the same way, the bearing blocks 31 and 31' are fixed on the wrapper of the steam generator by the intermediary of a base plate 34 and the blocks 32, 32' and 32" through the intermediary of a base plate 35.

The transverse holding of the lower part of the steam generator 21 is provided by an assembly of seven identical adjustable holding devices which will be described in more detail with reference to FIGS. 3 and 4, and with reference to the lateral holding device 24. However, the description which follows is applicable to the set of holding devices constituting the lateral and front supports represented in FIG. 2.

The transverse holding device 24 is fixed on a flat support structure 25 fixed through the intermediary of embedding tie rods 26 onto the wall 20b of the bunker of the steam generator 21.

The support assembly 25 comprises an outer metal plate attached against a flat concrete plate, the assembly constituting the support block being itself embedded by the tie rods 26 into the wall 20b.

The transverse holding device 24 comprises a first base plate 40 fixed by screws 41 onto the metal plate constituting the external part of the support assembly 25.

The device 24 also comprises a second base plate 42 which is connected, by of screws 43 to the first base plate 40.

A deformable structure for energy absorption 45 is interposed between the base plates 40 and 42.

The assembling screws 43 are engaged with a certain play in smooth holes in the plate 42 on which they come to bear by the screw heads and are screwed within the tapped holes in the plate 40.

Moreover guiding columns 44 are fixed on the plate 40 at one of their ends and engage slidingly in sleeves fixed within the orifices passing through the plate 42.

The screws 43 and the columns 44 allow the base plate 42 to be held against the deformable assembly 45 and to guide the plate 42, which is likely to move in the transverse direction 47 constituting the axial direction of the support 24 when the steam generator 21 is brought to bear against the support 24; this may result in a deformation of the assembly 45.

The deformable assembly 45 is held on the base plate 40, by feet 49 fixed by screws. The assembly 45 is manufactured in the shape of an elasto-plastic cushion of parallelepipedal shape constituted by crossed metal bars arranged in several layers, in directions at 90° from each other and staggered.

Such a deformable assembly with crossed bars is known in the prior art and used for absorbing, by deformation, the energy transmitted to the front supports, situated in the axis of the hot leg, of a steam generator.

On the outer face of the second base plate 42 directed towards the steam generator 21, a load distribution block 50, of parallelepipedal shape and comprising a cylindrical central orifice, is fixed by the screws 51.

The central orifice 50a of the distribution block 50 comprises a diametrically widened part 50b in which is engaged a part of a nut 52, in such a manner that the tapped orifice 52a of the nut 52 is arranged along the axis 47 extending in the transverse direction of movement of the support. The nut 52 is fixed by screws 53 onto the distribution block 50.

One screw 54 is engaged by screwing in the tapped orifice 52a of the nut 52.

The screw 54 comprises a head 54a having one part in the shape of a spherical cap upon which is attached a bearing pad 55 having an internal cavity 55a in the shape of a spherical cap coming into contact with the surface of the end part 54a of the screw.

The bearing pad 55 is fixed on the end part of the screw 54 by a fixing screw 56 and a spring washer 58, in such a way that the pad 55 has a slight latitude of orientation with respect to the screw 54.

The bearing pad 55 is arranged opposite the surface of the bearing block or shoe 31 fixed on the wrapper of the steam generator through the intermediary of the cylindrical base plate 33.

The nut 52 comprises a slot 57 in a plane perpendicular to the axis 47 of the nut, the slot 57 opening into the tipped bore 52a of the nut 52 and having a circumferential extension slightly greater than the half-circumference of the nut.

The slot 57 which is arranged at a short distance from the outer face of the nut 52 delimits a deformable part 52b of the nut 52 which can be brought closer to the remaining part of the nut by press-screws such as 59.

The deformable part of the nut comprises a part of the tapped orifice 52a of the nut, so that this tapped part can be moved by tightening the screws 59 so as to block the screw 54 in a predetermined axial position within the tapped orifice 52a.

The screw 54, which can be moved by screwing in one direction or the other within the nut 52, when the press-screws 59 are in the untightened position constitutes a screw-jack, the position in the axial direction of which can be fixed by tightening the screws 59.

During hot testing of the steam generator 21, it is thus possible to fix the position of the bearing surface of the pad 55 with respect to the external surface of the bearing block or shoe 31.

For example, the screw 54 can be placed in a position such that a play 60 remains between the bearing surface of the pad 55 and the outer surface of the shoe 31. The play 60 is determined as a function of movements of the steam generator which are of thermal origin and can be calculated.

The position of the screw allowing the play 60 to be obtained is fixed by tightening the screws 59.

Figure 3:
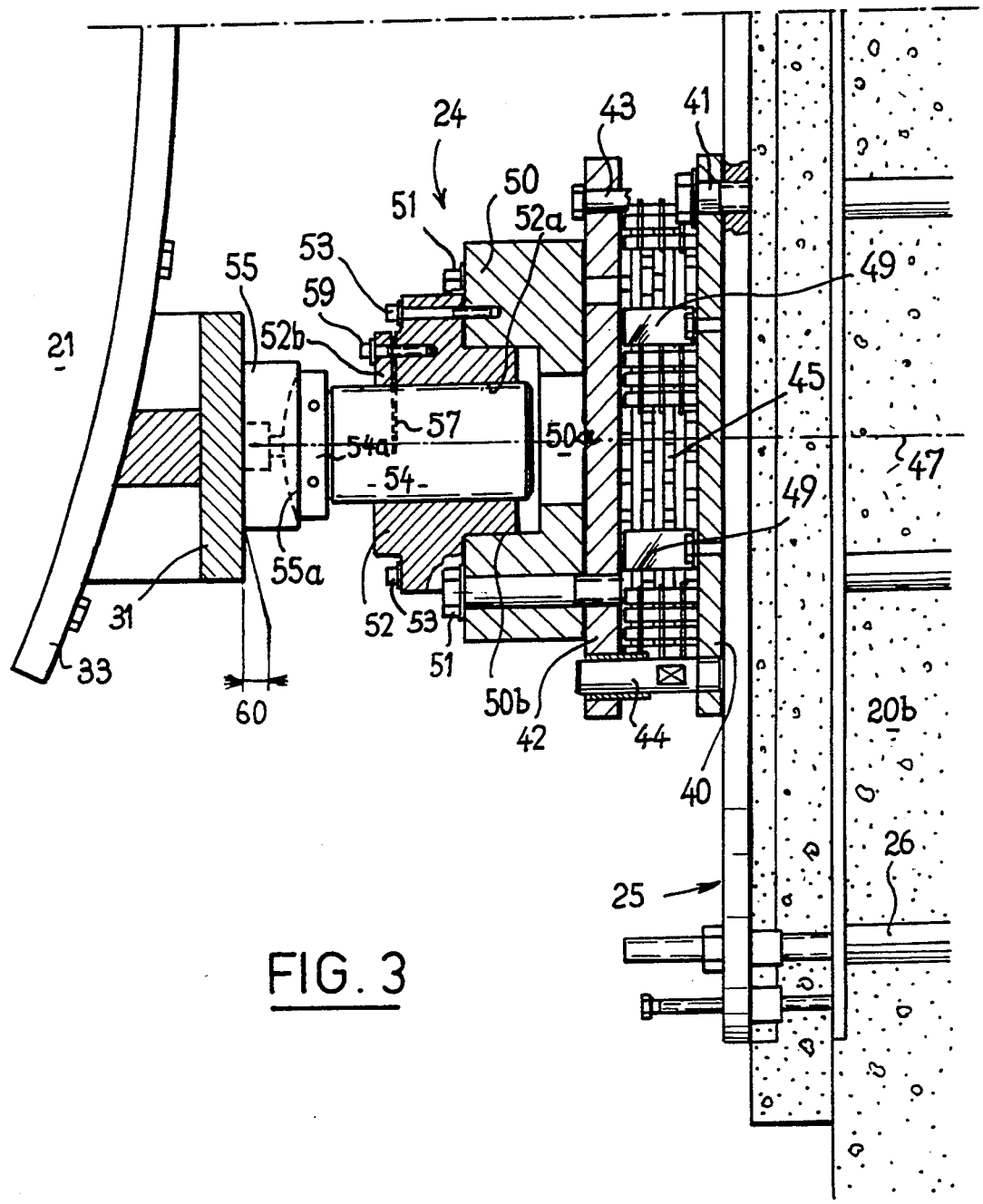
FIG. 3 is a view sectioned through a horizontal plane, of a transverse holding device for a steam generator, according to the invention.
Figure 4:
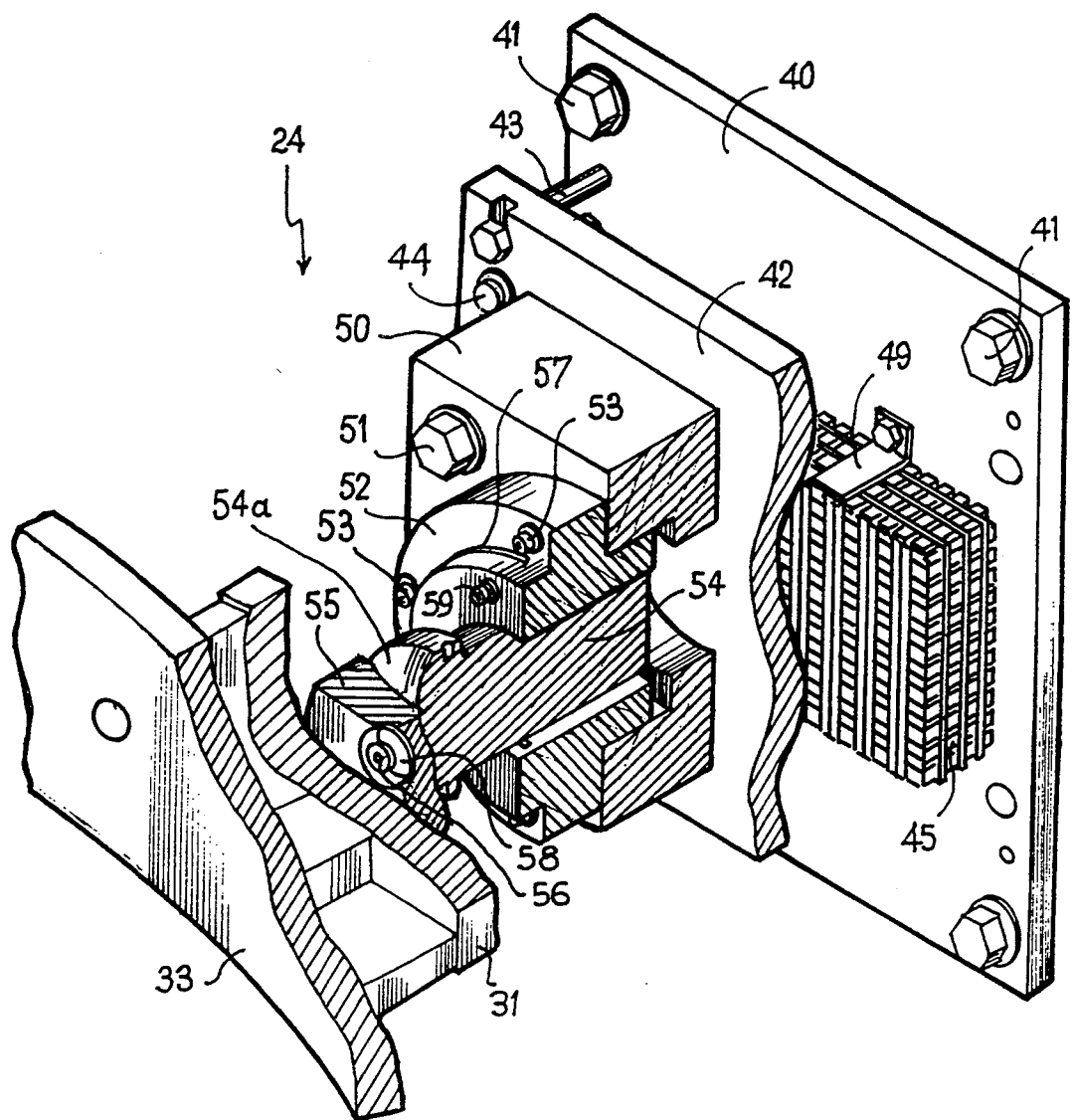
FIG. 4 is an exploded perspective view of the transverse holding device represented in FIG. 3.

There will now be described an operation for adjusting the supports of a transverse holding assembly for the lower part of a steam generator, these supports being constituted by holding devices according to the invention such as represented in FIGS. 3 and 4.

The transverse holding of the steam generator is provided by four lateral supports and three front supports arranged as represented in FIG. 2.

The adjustment is carried out during hot testing of the nuclear reactor, the cooling water of the nuclear reactor circulating in the steam generator being at a temperature of 28620 C. and at a pressure of 155 bar.

The screws 54 of the support assembly are unscrewed into a position such that the bearing pad securely attached to the end of the screw comes into contact with the corresponding shoe fixed on the wrapper of the steam generator, at the height of the tube plate.

The screws 54 of the supports 22 and 22' arranged on the side of the intermediate leg of the primary circuit and of the motor-driven pump group are blocked in position by tightening the screws 59, so as to retain the position leading to zero play at the service temperature and under the service conditions of the steam generator.

The lateral supports 24 and 24' situated opposite the supports 22 and 22' with respect to the plane 23 are moved, so as to introduce a certain play between their bearing pad and the corresponding shoes 31 and 31' fixed on the wrapper of the steam generator. To this end, the screws 54 of the supports 24 and 24' are moved in the axial direction, by screwing by a number of turns corresponding to the desired play. The screws 54 are then blocked in position by tightening the screws 59 providing the deformation of the nut.

The play between the supports 24 and 24' and the bearing parts of the steam generator is provided in order to allow accidental movements or movements of thermal origin of the steam generator between the lateral supports which ensure its guiding.

The front supports 28, 28' and 28" are adjusted by their screws 54, so that a play 61 (FIG. 2) which is relatively significant is maintained between the bearing pad of the support and the corresponding shoe 32, 32', 32". The play 61 can be of the order of 50 mm, so as to allow significant movement of the steam generator in the axis of the hot leg corresponding to the trace of the plane 23 in FIG. 2.

The adjustment of the assembly of the transverse holding device for the lower part of the steam generator is provided by adjusting an assembly of seven supports, each of the supports being adjusted by a screw placed in the desired axial position and then blocked in position.

These operations which are carried out during hot testing of the nuclear reactor are carried out much more easily and more rapidly than the adjusting operations according to the prior art, which required measurement and machining and installation of shims.

Moreover, the adjustment of the play can be carried out in a very precise manner, the position of the screw-jack being able to be fixed with very great precision by counting the number of turns or fractions of turns necessary in the direction of screwing, from the reference position corresponding to placing the bearing pad in contact with the shoe which is securely attached to the wrapper of the steam generator.

The simplicity of the operations and the reduction in the time required for adjustment constitute very considerable advantages, in particular when replacing a steam generator.

The means for blocking the screw in its adjusting position can be carried out by means other than a screw for tightening a deformable part of the nut, for example in a more conventional manner, by a lock nut, a split lock nut, or by locking screws.

The bearing pad of the support and the bearing blocks securely attached to the steam generator can have shapes other than those which have been described.

The second base plate of the support on which the nut is fixed, could be fixed directly onto a stationary concrete wall instead of being attached to a first base plate with the interposition of a deformable element.

The support according to the embodiment which has been described has the advantage of comprising an assembly constituted by the bearing pad, the screw, the nut, the distribution block and the second base plate which is able to move in the axial direction of the support, being perfectly guided by the columns which are securely attached to the first base plate.

In the event of movement of the support under the effect of a deformation or a movement of the steam generator, the mobile assembly of the support remains perfectly aligned along the axial direction, despite a deformation which could be irreversible of the deformable assembly 45 which ensures the absorption of part of the energy brought into play during a movement of the steam generator.

The deformable assembly can be of a different type other than that which has been described which comprises successive layers of crossed bars.

The invention applies to the transverse holding of any component of large dimensions of a nuclear reactor arranged in a locality and able to move with respect to the walls of the locality, as a result of heat or through accidental causes such as an earthquake.

I claim:

1. Transverse holding device for a component of a steam generator of a pressurized-water nuclear reactor, arranged in a stationary concrete structure having vertical walls surrounding the component, comprising at least one base plate fixed on one wall of the concrete structure and a bearing element carried by the base plate and adapted to be arranged in contact with or in the vicinity of a bearing surface of the component, wherein said transverse holding device comprises an assembly for adjusting and positioning the bearing element constituted by:
   (a) a nut having an axis carried by the base plate traversed by a tapped orifice directed along the axis of the nut;
   (b) a screw-jack engaged with the nut and arranged in the axial direction of the nut; and (c) means for blocking the screw-jack with respect to the nut, in a specified position of the screw-jack in the axial direction,
   the bearing element being constituted by a pad carried by one end of the screw-jack directed towards the bearing surface of the component.

2. Device according to claim 1, wherein the nut comprises a slot in a plane perpendicular to said axis of said nut opening into the tapped bore of the nut, and wherein the means for blocking the screw-jack with respect to the nut is constituted by at least one press-screw engaged in a tapped hole within the nut and bearing on a deformable part of the nut delimited by the slot and comprising a part of the tapped orifice of the nut.

3. Device according to claim 1 or 2, comprising a first flat base plate constituting the base plate fixed on the wall of the stationary concrete structure, a second flat base plate parallel and connected to the first base plate, an element which can be deformed by compression interposed between the first base plate and the second base plate, the nut being fixed on the second base plate in such a manner that the screw-jack, the nut and the second base plate constitute an assembly which can be moved in the axial direction with respect to the first base plate under the effect of stress leading to deformation of the deformable assembly.

4. Device according to claim 3, wherein the second base plate is connected to the first base plate by screws fixed in the tapped holes of the first base plate, engaged freely in orifices passing through the second base plate and bearing by an end part on the face of the second base plate directed towards the component.

5. Device according to claim 4, further comprising at least three guiding columns fixed on the first base plate and engaged in the orifices of the second base plate, providing the guiding of the second base plate of the nut and of the screw in the axial direction.

6. Device according to claim 3, wherein the nut is fixed on the second base plate by a load distribution block.

7. Device according to claim 1 or 2, wherein the screw comprises an end part directed towards the bearing surface of the component having a surface in the shape of a convex spherical cap, and the pad which comprises a cavity in the shape of a spherical cap intended to come to bear on the end of the screw in the shape of a spherical cap is connected to the screw by elastic connecting means allowing adaptation of the orientation of the pad with respect to the axis of the screw.

8. Assembly for transversely holding the lower part of a steam generator connected by a first pipeline or hot leg to the vessel of a nuclear reactor and by a second pipeline to a primary pump of the reactor, said assembly comprising two pairs of lateral supports situated in substantially symmetrical positions on either side of a vertical plane passing through the axis of the hot leg and three front supports situated in the vicinity of the vertical plane passing through the axis of the hot leg, opposite the connection zone between the hot leg and the steam generator, the lateral supports and the front supports each being constituted by a transverse holding device according to claim 1.

9. Method for adjusting an assembly comprising two pairs of lateral supports for transversely holding a steam generator of a pressurized-water nuclear reactor during hot testing of the nuclear reactor, the steam generator being at its service temperature, said method comprising the steps of:

(a) bringing bearing pads of each one of the supports into contact with a corresponding bearing surface of the steam generator by unscrewing a corresponding screw;
(b) blocking screw-jacks of one part of lateral supports arranged on one side of a vertical plane passing through the axis of a hot leg in position; and
(c) for the other pair of lateral supports arranged on the other side of a vertical plane passing through the axis of the hot leg and for the front supports, moving the screw in the axial direction, by screwing, by a specified distance corresponding to a play between the bearing pad of the support and the corresponding part of the bearing surface of the steam generator, in order to allow guided movement of the steam generator between the supports as a result of thermal effects in service or through accidental causes.

* * * * *